(12) United States Patent
Yamane

(10) Patent No.: US 7,537,033 B2
(45) Date of Patent: May 26, 2009

(54) PNEUMATIC TIRE WITH TREAD INCLUDING CIRCUMFERENTIAL GROOVES HAVING INCLINED RIDGES OR RECESSES

(75) Inventor: Kenji Yamane, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 64 days.

(21) Appl. No.: 10/532,430

(22) PCT Filed: Nov. 18, 2003

(86) PCT No.: PCT/JP03/14645

§ 371 (c)(1),
(2), (4) Date: Apr. 25, 2005

(87) PCT Pub. No.: WO2004/048130

PCT Pub. Date: Jun. 10, 2004

(65) Prior Publication Data

US 2006/0090828 A1    May 4, 2006

(30) Foreign Application Priority Data

Nov. 26, 2002    (JP) .............................. 2002-341833

(51) Int. Cl.
*B60C 11/13*    (2006.01)
(52) U.S. Cl. .............................. 152/209.21; 152/209.22
(58) Field of Classification Search ............ 152/209.21, 152/209.22
See application file for complete search history.

(56) References Cited

U.S. PATENT DOCUMENTS

| | | | | |
|---|---|---|---|---|
| 2,268,344 A | * | 12/1941 | Shesterkin ............. | 152/209.22 |
| 4,299,264 A | * | 11/1981 | Williams ............... | 152/209.28 |
| 5,211,779 A | * | 5/1993 | Tomioka et al. ............. | 152/902 |
| 5,535,798 A | | 7/1996 | Nakamura | |
| 6,415,835 B1 | * | 7/2002 | Heinen ................... | 152/209.22 |
| 7,004,216 B2 | * | 2/2006 | Godefroid .............. | 152/209.22 |
| 2001/0032691 A1 | | 10/2001 | Ohsawa | |

FOREIGN PATENT DOCUMENTS

| | | |
|---|---|---|
| EP | 0 602 989 A1 | 6/1994 |
| EP | 1 216 853 A2 | 6/2002 |
| JP | S60-3102 | 1/1985 |
| JP | 04-201606 A1 | 7/1992 |
| JP | 06-099705 A1 | 4/1994 |
| JP | 09-011708 A1 | 1/1997 |

(Continued)

OTHER PUBLICATIONS translation for Japan 2001-287509 (Feb. 2009).*

(Continued)

*Primary Examiner*—Steven D Maki
(74) *Attorney, Agent, or Firm*—Greer, Burns & Crain, Ltd.

(57) ABSTRACT

A pneumatic tire which positively discharges water having flowed into a groove extending in the tire circumferential direction and enhances capability of preventing hydroplaning. The groove is provided in the tread face of the tire and extends in the tire circumferential direction. The wall face of the groove is provided with line portions composed of a plurality of ridges or recesses that are inclined in one direction with respect to the groove longitudinal direction.

3 Claims, 3 Drawing Sheets

FOREIGN PATENT DOCUMENTS

| | | |
|---|---|---|
| JP | 10-076810 A1 | 3/1998 |
| JP | 2000-318411 A1 | 11/2000 |
| JP | 2001-287509 * | 10/2001 |
| JP | 2002-036820 A1 | 2/2002 |
| JP | 2002-219906 | 8/2002 |
| JP | 2003-054220 A1 | 2/2003 |
| JP | 2003-146024 A1 | 5/2003 |
| JP | 2003-312212 A1 | 11/2003 |
| WO | WO-95/18022 A1 | 7/1995 |

OTHER PUBLICATIONS

PCT International Search Report for PCT/JP03/14645 mailed on Mar. 2, 2004.

* cited by examiner

PNEUMATIC TIRE WITH TREAD INCLUDING CIRCUMFERENTIAL GROOVES HAVING INCLINED RIDGES OR RECESSES

TECHNICAL FIELD

The present invention relates to a pneumatic tire with improved drainage, and specifically, relates to a pneumatic tire which positively discharges water having flowed into a groove extending in the tire circumferential direction and enhances capability of preventing hydroplaning.

BACKGROUND TECHNOLOGY

In a pneumatic tire, a groove extending in the tire circumferential direction is formed in a tread surface to ensure drainage in the rain and the like. In order to improve drainage of such a pneumatic tire and prevent occurrence of hydroplaning, various proposals have hitherto been made in terms of arrangement of grooves in the tread surface and the like. In those proposals, there is a pneumatic tire in which a curved inclined groove which is formed in the tread surface is provided with a protruded rim extending in the groove longitudinal direction in the bottom of the groove to rectify water having flowed into the groove and thus improve the drainage (for example, see the Japanese Patent Laid-Open publication No. 2000-318411).

It is true that when the protruded rim extending in the groove longitudinal direction is provided in the bottom of the groove as described above, reduction of the drainage due to turbulence of the water flow can be avoided. However, it is not possible to obtain an effect of positively discharging water having flowed into the groove to the exterior. Accordingly, the capability of preventing hydroplaning has not necessarily been sufficient.

DISCLOSURE OF THE INVENTION

An object of the present invention is to provide a pneumatic tire capable of positively discharging water having flowed into a groove extending in the tire circumferential direction and enhancing the capability of preventing hydroplaning.

An aspect of the present invention is a pneumatic tire provided with a groove extending in a tire circumferential direction in a tread surface, and the pneumatic tire is characterized by including line portions provided in a wall face of the groove, the line portions being composed of a plurality of ridges or recesses inclined in one direction with respect to a groove longitudinal direction.

Herein, preferably, an inclined angle of the line portions with respect to the groove longitudinal direction is 10 to 60°, a height thereof is not smaller than 0.3 mm and is not more than 20% of each of a width and a depth of the groove, and a pitch interval of the line portions is preferably 1.5 to 8.0 mm. In addition, preferably, the line portions are provided in a range of not less than 50% of the wall face of the groove in a cross section of the groove orthogonal to the groove longitudinal direction.

Accordingly, water having flowed into the groove flows along the line portions, which are formed in the wall face of the groove and spirally arranged, and forms a vortex flow. The water is then accelerated to progress within the groove and discharged to the exterior. Since water on a road is a continuum, a negative pressure is created within the groove according to the amount of water accelerated and discharged. Thus, a larger amount of water is drawn into the groove, and a larger amount of water is then discharged. Moreover, since the water progressing within the groove while forming the vortex flow moves toward the center position of the groove space while swirling, thereby the contact resistance between water and the wall face of the groove is significantly reduced, and the discharging action is assisted as a result. The capability of preventing hydroplaning can be therefore dramatically improved.

BEST MODE FOR CARRYING OUT THE INVENTION

Figure 1:
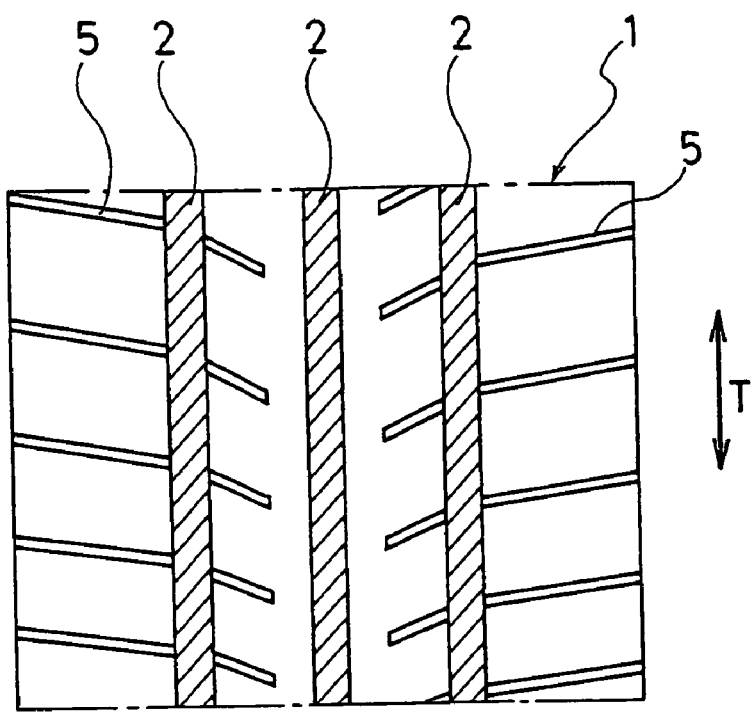
FIG. 1 is a plan view showing a tread surface of a pneumatic tire according to an embodiment of the present invention.

Hereinafter, a description is given of an embodiment of the present invention with reference to the accompanying drawings. In the drawings, same components are given same reference numerals, and a redundant description is omitted.

Figure 2:
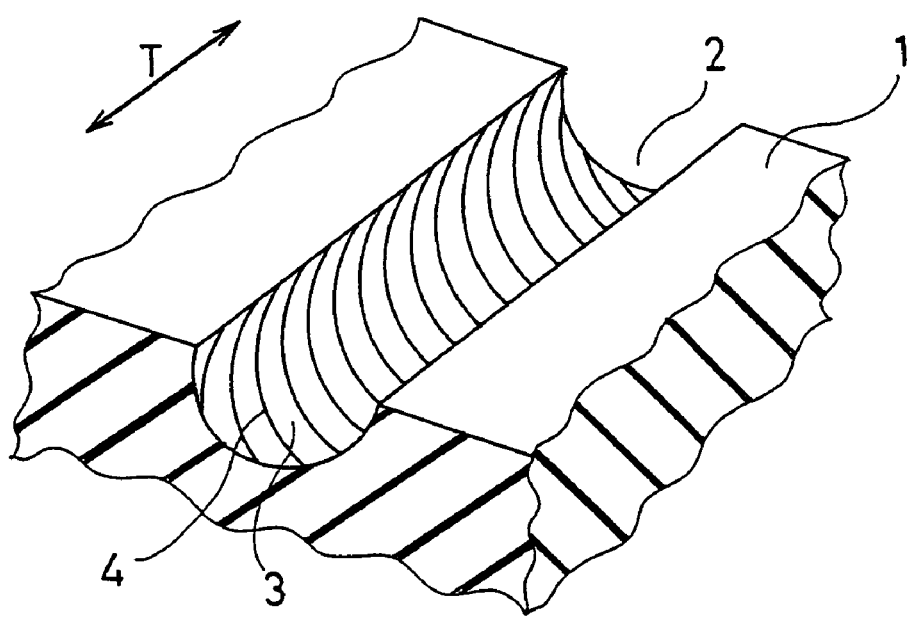
FIG. 2 is a perspective view showing a main portion of FIG. 1.
Figure 3:
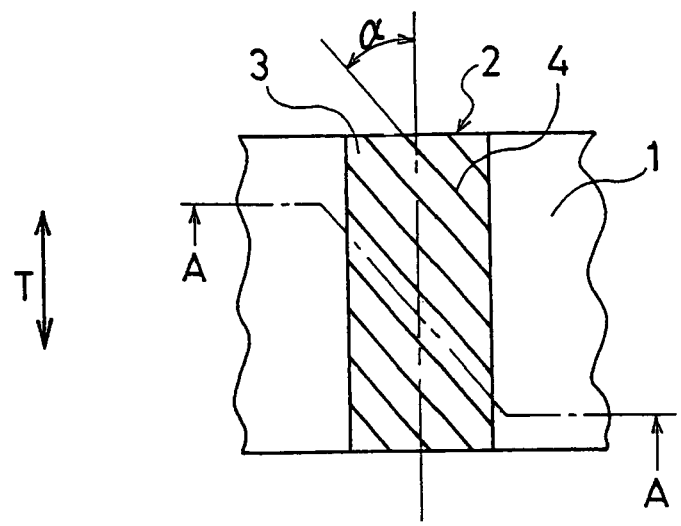
FIG. 3 is a plan view of FIG. 2.
Figure 4:
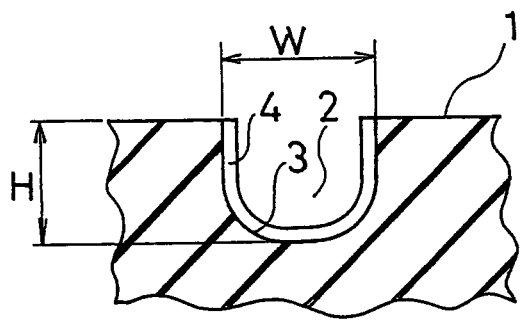
FIG. 4 is a cross-sectional view of FIG. 3 taken along a line A-A.
Figure 5A:
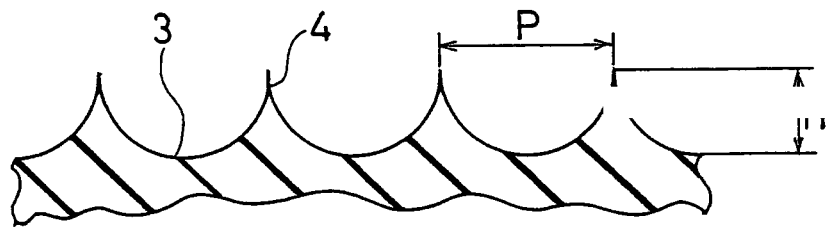
FIGS. 5A to 5C are cross-sectional views, each showing a cross-sectional shape of line portions formed in a groove.
Figure 5B:
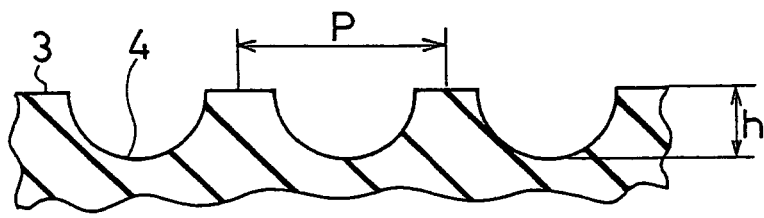
Figure 5C:
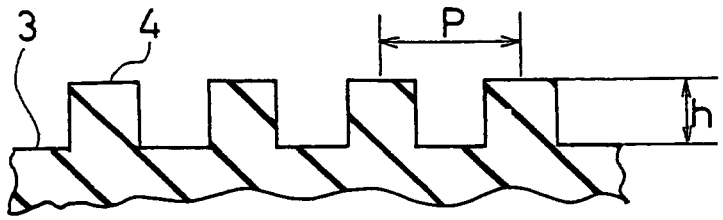

FIG. 1 shows a tread surface of a pneumatic tire according to an embodiment of the present invention; FIGS. 2 to 4 show a main portion thereof; and each of FIG. 5A to 5C shows a cross-sectional shape of line portions formed in a groove.

In FIG. 1, a plurality of grooves (circumferential grooves) 2 extending in a tire circumferential direction T and a plurality of grooves (lateral grooves) 5 extending in the tire width direction are formed in a tread surface 1. As shown in FIG. 2, in a wall face 3 of at least one of the grooves 2 extending in the tire circumferential direction T, line portions 4 inclined in one direction with respect to the groove longitudinal direction are formed.

It is preferable that the line portions 4 formed in the wall face 3 of the groove 2 has an inclined angle α of 10 to 60 degrees with respect to the groove longitudinal direction (i.e., the tire circumferential direction T) as shown in FIG. 3 so that water having flowed into the groove 2 forms vortices to easily flow. When this inclined angle α is out of the above range, the effect of creating a vortex flow is insufficient. It is obvious that the inclined direction of the grooves 2 is not particularly limited.

The line portions 4 are composed of ridges or recesses provided in the wall face 3 of the groove 2. The cross-sectional shape thereof is not particularly limited and can adopt shapes shown in FIGS. 5A to 5C. In any case thereof, preferably, a height h of the line portions 4 is not less than 0.3 mm. When the height h is less than 0.3 mm, the effect of creating a vortex flow is insufficient. As shown in FIG. 4, it is preferable that the height h of the line portions 4 is not more than 20% of each of a groove width W and a groove depth H of the groove 2. When the height h of the line portions 4 is too large, reduction in the volume of the groove deteriorates the drainage in the case where the line portions 4 are ridges, and it is difficult to ensure an adequate rubber gauge between the groove bottom and an outermost belt layer in the case where the line portions are recesses.

Preferably, a pitch interval P of the line portions 4 is 1.5 to 8.0 mm. When the pitch interval P is out of the above range, the effect of creating a vortex flow is insufficient.

Preferably, the line portions 4 are formed in the entire wall face 3 of the groove 2. However, the line portions 4 made discontinuous or provided in a part of the wall face 3 of the groove 2 are also expected to offer the effect of creating a vortex flow. In these cases, the line portions 4 are required to be provided in a range of not less than 50% of the wall face 3 of the groove 2 in a cross-section of the groove 2 orthogonal to the grove longitudinal direction.

In the pneumatic tire provided with the line portions 4 in the side wall 3 of the groove 2 extending in the tire circumferential direction as described above, water flowed into the groove 2 flows along the line portions 4 spirally arranged to form a vortex flow and is efficiently discharged from the groove 2, for example, when traveling in the rain.

Figure 6:
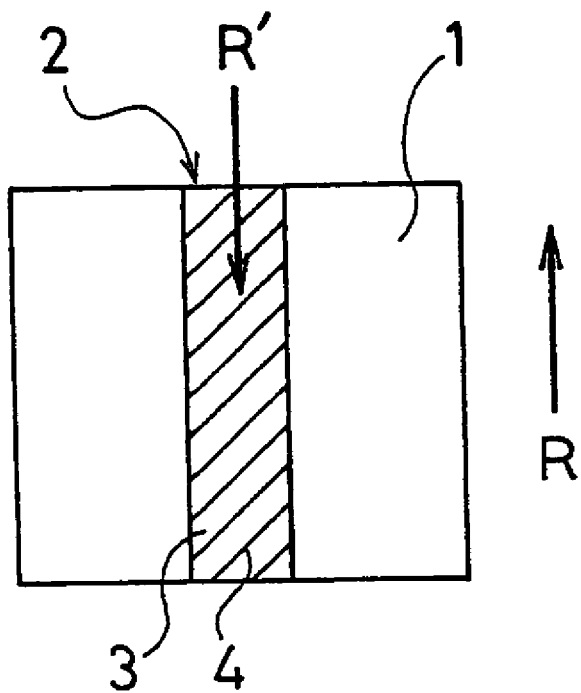
FIG. 6 is an explanatory plan view for explaining a discharging action according to the present invention.
Figure 7:
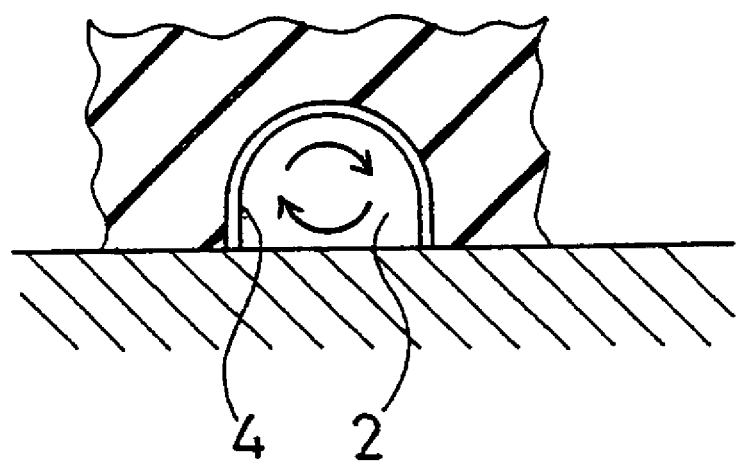
FIG. 7 is an explanatory cross-sectional view for explaining the discharging action according to the present invention.

Herein, a description is given of the above discharging action with reference to FIGS. 6 and 7. As shown in FIG. 6, when a vehicle progresses in a direction indicated by an arrow R, water flowed into the groove 2 is discharged in a direction indicated by an arrow R'. At this time, since the water forms the vortex flow along the line portions 4 in the wall face 3, the water is accelerated to progress within the groove 2 and then discharged to the exterior. According to the amount of water accelerated and discharged, a negative pressure is created within the groove 2. Accordingly, a larger amount of water is drawn into the groove 2, and a larger amount of water is discharged off. Moreover, as shown in FIG. 7, water progressing within the groove 2 while forming the vortex flow moves toward the center position of the groove space while swirling. Accordingly, the contact resistance between water and the wall face of the groove is dramatically reduced, and the discharging action is assisted as a result. It is therefore possible to provide an excellent capability of preventing hydroplaning.

EXAMPLES

The pneumatic tires (Examples 1 to 5) of the present invention were fabricated as follows. In pneumatic tires (size: 205/60R15) each having the block pattern of FIG. 1, the line portions were provided in the wall face of the grooves extending in the tire circumferential direction, and the inclined angle a, height h, pitch interval P thereof were varied as shown in Table 1. For comparison, a conventional tire (Conventional Example) which was not provided with the line portions in the wall face of the grooves extending in the tire circumferential direction was fabricated. The grooves provided with the line portions had a groove width of 10 mm and a groove depth of 8 mm.

Each of these test tires was mounted on a domestically-produced car of 2.0 liter displacement and subjected to a hydroplaning test in straight running. In this hydroplaning test in straight running, the car was driven on a straight road provided with a pool having a water depth of 10 mm. The speed at which the car entered that pool was gradually increased, and the speed when hydroplaning occurred was measured. The evaluation results were shown in Table 1 by indices with the measured speed of Conventional Example being 100. Larger indices mean that the capability of preventing hydroplaning is more excellent.

TABLE 1

|  | Conventional Example | Example 1 | Example 2 | Example 3 | Example 4 | Example 5 |
|---|---|---|---|---|---|---|
| Inclined angle α (°) | — | 10 | 35 | 60 | 35 | 35 |
| Pitch interval P (mm) | — | 4 | 4 | 7 | 1.5 | 8 |
| Height h (mm) | — | 0.3 | 1.4 | 1.0 | 1.4 | 1.4 |
| Hydroplaning preventing capability | 100 | 105 | 110 | 108 | 108 | 108 |

As apparent from the table 1, the capability of preventing hydroplaning of the tires according to the present invention was superior to that of the conventional tire.

INDUSTRIAL APPLICABILITY

According to the present invention, in a pneumatic tire provided with a groove extending in the tire circumferential direction in the tread surface, the line portions composed of the plurality of ridges or recesses inclined in one direction with respect to the groove longitudinal direction are provided in the wall face of the groove. Water flowed into the groove extending in the tire circumferential direction is thereby positively discharged, and the capability of preventing hydroplaning can be enhanced.

Hereinabove, the preferred embodiment according to the present invention was described in detail, and it should be understood that various modifications, replacements, and substitutions can be made without departing from the spirit and the scope of the present invention as defined by the appended claims.

What is claimed is:

1. A pneumatic tire comprising:
   a plurality of circumferential grooves extending in a tire circumferential direction in a tread surface having a width and a circumferential center;
   a plurality of lateral grooves extending from the circumferential grooves away from the circumferential center of the tread surface, the lateral grooves being open at their distal ends from the circumferential center of the tread surface and provided intermittently in the tire circumferential direction; and
   line portions provided in a wall face of the circumferential grooves, the line portions being composed of a plurality of ridges or recesses that are inclined from 10 ° to 35° with respect to the tire circumferential direction;
   wherein water can flow in the circumferential grooves along the line portions to form a vortex flow, and can be discharged from the circumferential grooves, and
   wherein the line portions are provided in a range of not less than 50% of the wall face of the circumferential grooves in a cross section of the circumferential grooves orthogonal to the groove longitudinal direction.

2. The pneumatic tire according to claim 1, wherein a height of the line portions is not smaller than 0.3 mm and is not more than 20% of each of a width and depth of the circumferential grooves.

3. The pneumatic tire according to claim 1, wherein a pitch interval of the line portions is 1.5 to 8.0 mm.

* * * * *